United States Patent
Liu et al.

(10) Patent No.: US 11,323,368 B1
(45) Date of Patent: *May 3, 2022

(54) SYSTEM AND METHOD FOR WEB SERVICE ATOMIC TRANSACTION (WS-AT) AFFINITY ROUTING

(71) Applicant: United Services Automobile Association (USAA), San Antonio, TX (US)

(72) Inventors: Yuesheng Liu, Helotes, TX (US); Agustin Donis, Helotes, TX (US); Edward C. Cox, Helotes, TX (US); Robert L. Johnson, San Antonio, TX (US); Joaquin Fernandez, Helotes, TX (US); Clayton Ray Krueger, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/841,580

(22) Filed: Apr. 6, 2020

Related U.S. Application Data

(63) Continuation of application No. 15/486,929, filed on Apr. 13, 2017, now Pat. No. 10,616,109.

(60) Provisional application No. 62/322,647, filed on Apr. 14, 2016.

(51) Int. Cl.
*H04L 12/741* (2013.01)
*H04L 29/08* (2006.01)
*H04L 45/745* (2022.01)
*H04L 67/02* (2022.01)

(52) U.S. Cl.
CPC ............ *H04L 45/745* (2013.01); *H04L 67/02* (2013.01)

(58) Field of Classification Search
CPC ........ H04L 67/02; H04L 45/745; H04L 45/00
See application file for complete search history.

(56) References Cited

U.S. PATENT DOCUMENTS

| | | | |
|---|---|---|---|
| 6,971,096 B1 * | 11/2005 | Ankireddipally | G06F 9/5038 707/999.1 |
| 9,747,288 B1 * | 8/2017 | Beckford | G06F 16/2308 |
| 2006/0178892 A1 * | 8/2006 | Oon | G16H 80/00 705/2 |

(Continued)

*Primary Examiner* — Minh Chau Nguyen
(74) *Attorney, Agent, or Firm* — Fletcher Yoder, P.C.

(57) ABSTRACT

A method of operating a web service atomic transaction (WS-AT) system includes: receiving, at a processor of an extensible markup language (XML) gateway, a first message from a communicatively coupled client, and inserting a WS-AT Transaction Identifier (ID) from a Simple Object Access Protocol (SOAP) header into a hypertext transfer protocol (HTTP) header of the first message to generate a first modified message. The method also includes: receiving, at a processor of a network device communicatively coupled to the XML gateway, the first modified message from the XML gateway, determining that the WS-AT Transaction ID is not yet associated with a service provider in a routing table, and in response, sending the first modified message to a particular service provider and associating the WS-AT Transaction ID with the particular service provider in the routing table such that future messages from the client can be routed to the particular service provider.

20 Claims, 4 Drawing Sheets

(56) References Cited

U.S. PATENT DOCUMENTS

| | | | |
|---|---|---|---|
| 2007/0127440 A1* | 6/2007 | Narayanaswami | H04L 67/142 370/352 |
| 2007/0271192 A1* | 11/2007 | Brunet | G06Q 20/16 705/78 |
| 2013/0019008 A1* | 1/2013 | Jorgenson | G06F 11/3495 709/224 |
| 2015/0269536 A1* | 9/2015 | Parris | G06Q 10/30 705/26.3 |
| 2015/0310544 A1* | 10/2015 | Baweja | G06Q 40/00 705/35 |

* cited by examiner

SYSTEM AND METHOD FOR WEB SERVICE ATOMIC TRANSACTION (WS-AT) AFFINITY ROUTING

CROSS REFERENCE TO RELATED APPLICATION

This application is a continuation of U.S. application Ser. No. 15/486,929, entitled "SYSTEM AND METHOD FOR WEB SERVICE ATOMIC TRANSACTION (WS-AT) AFFINITY ROUTING," filed Apr. 13, 2017, which claims priority to and the benefit of U.S. Provisional Application No. 62/322,647, entitled "SYSTEM AND METHOD FOR WEB SERVICE ATOMIC TRANSACTION (WS-AT) AFFINITY ROUTING," filed Apr. 14, 2016, which are hereby incorporated by reference in their entirety for all purposes.

BACKGROUND

The present disclosure relates generally to web services, and, more specifically, to web service atomic transaction (WS-AT) systems.

Web Service Atomic Transaction (WS-AT) is a technology standard widely adopted by the industry. WS-AT is a web service standard created by the Organization for the Advancement of Structured Information Standards (OASIS), and the standard provides a specific coordination type that defines protocols for atomic transactions that are ACID (Atomicity, Consistency, Isolation, Durability) compliant. Further, WS-AT includes a two-phase commit transaction protocol and is suitable for short-duration transactions, as well as an interoperability protocol that introduces no new programming interfaces for transaction support.

In a large-scale environment, it is presently recognized that WS-AT systems can suffer from deadlock. For example, because there may be numerous service providers present in a large-scale WS-AT system, each generally operating independently of one another, deadlock can result when two or more service providers unknowingly attempt to access the same resource at the same time (e.g., modify the same database entry) when attempting to satisfy client requests. Such deadlock can result in delays and connection time-outs as client requests remain unsatisfied, as well as additional network traffic and demand on processing resources as clients resubmit requests. As such, it is generally desirable to avoid or prevent deadlock, especially in large-scale environments that include numerous service providers.

BRIEF DESCRIPTION

In an embodiment, a web service atomic transaction (WS-AT) system with affinity routing includes an extensible markup language (XML) gateway comprising a first memory and a first processor. The first processor is configured to: receive a message from a client; determine a Transaction Identifier (ID) of the message from a Simple Object Access Protocol (SOAP) header of the message; modify the message to include the Transaction ID in a hypertext transfer protocol (HTTP) header of the message; and send the modified message to a networking device communicatively coupled to the XML gateway. The system also includes the networking device comprising a second memory storing a routing table and a second processor. The second process is configured to: receive the modified message from the XML gateway; determine the Transaction ID of the modified message from the HTTP header of the modified message; determine whether the Transaction ID is present within the routing table; and send the modified message to a service provider that is associated with the Transaction ID in the routing table, when the Transaction ID is present within the routing table; or send the modified message to an available service provider and associating the Transaction ID with the available service provider in the routing table, when the Transaction ID is not present within the routing table.

In another embodiment, a web service atomic transaction (WS-AT) system includes a networking device communicatively coupled to a plurality of service providers and an extensible markup language (XML) gateway communicatively coupled to the networking device and to a plurality of clients. The XML gateway includes a first memory and a first processor configured to: receive a message from a client of the plurality of clients, wherein the message includes a Simple Object Access Protocol (SOAP) header having a WS-AT Transaction Identifier (ID) and a hypertext transfer protocol (HTTP) header; insert the WS-AT Transaction ID from the SOAP header into the HTTP header to generate a modified message; and send the modified message to the networking device. The networking device comprises a second processor and second memory that includes a routing table storing associations between a plurality of WS-AT Transaction IDs and a plurality of service providers communicatively coupled to the networking device. The second processor is configured to: receive the modified message from the XML gateway; determine the WS-AT Transaction ID of the modified message from the HTTP header of the modified message; and determine whether the WS-AT Transaction ID is associated with a service provider of the plurality of service providers in the routing table, and in response to determining that it is, send the modified message to the associated service provider, and in response to determining that it is not, send the modified message to an available service provider of the plurality of service providers and associate the WS-AT Transaction ID with the available service provider in the routing table.

In another embodiment, a method of operating a web service atomic transaction (WS-AT) system includes: receiving, at a processor of an extensible markup language (XML) XML gateway, a first message from a communicatively coupled client, wherein the first message includes a Simple Object Access Protocol (SOAP) header having a WS-AT Transaction Identifier (ID) and a hypertext transfer protocol (HTTP) header; inserting, via the processor of the XML gateway, the WS-AT Transaction ID from the SOAP header into the HTTP header of the first message to generate a first modified message; and sending, via the processor of the XML gateway, the first modified message to a networking device communicatively coupled to the XML gateway. The method further includes: receiving, at a processor of the network device, the first modified message from the XML gateway; determining, via the processor of the network device, the WS-AT Transaction ID of the first modified message from the HTTP header of the first modified message; and determining, via the processor of the network device, that the WS-AT Transaction ID is not yet associated with a service provider in a routing table stored in a memory of the network device in response to the WS-Transaction ID, and in response, sending the first modified message to a particular service provider and associating the WS-AT Transaction ID with the particular service provider in the routing table.

DRAWINGS

These and other features, aspects, and advantages of the present disclosure will become better understood when the following detailed description is read with reference to the accompanying drawings in which like characters represent like parts throughout the drawings, wherein.

Figure 5:
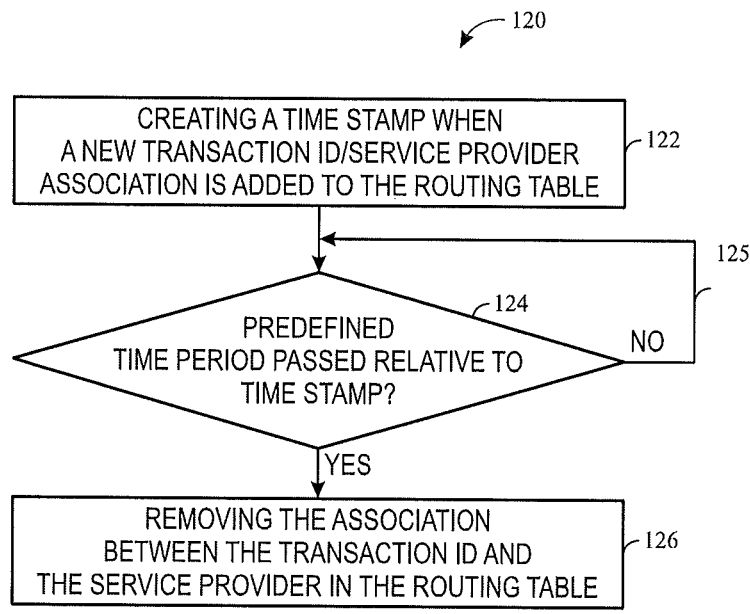
Figure 6:
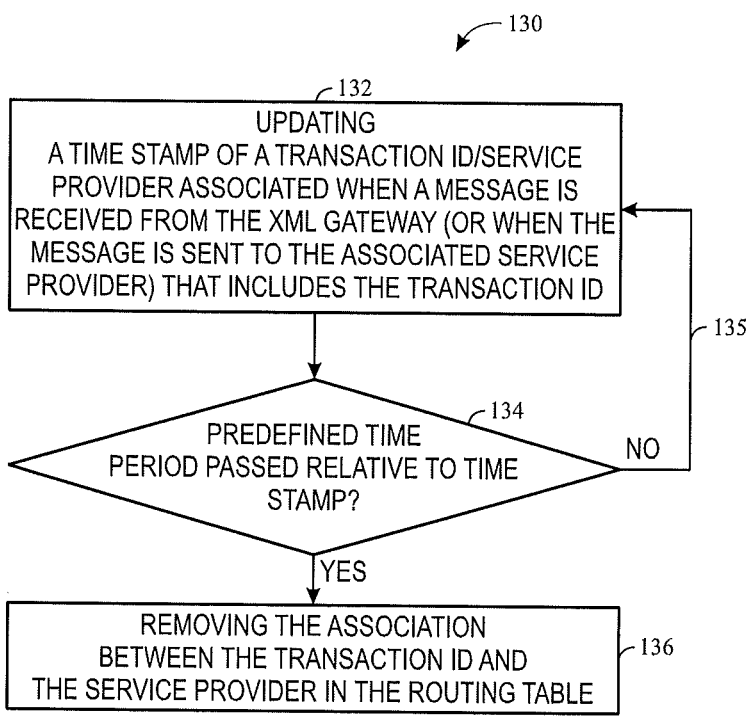

FIG. 5 is a flow diagram illustrating an example of a process whereby the processor of the networking device defines an affinity duration based on an arrival time of a first client message of a transaction, in accordance with embodiments of the present technique; and FIG. 6 is a flow diagram illustrating an example of a process whereby the processor of the networking device defines an affinity duration based on an arrival time of the most recent client message of a transaction, in accordance with embodiments of the present technique.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for providing routing affinity within WS-AT systems, particularly large-scale WS-AT systems that include too many service providers (e.g., greater than 20, greater than 50, greater than 100 service providers) to feasibly or practically group all of the service providers into a single cluster. The disclosed WS-AT systems enable all requests from a particular client transaction to be effectively routed to the same service provider for fulfillment. As discussed in greater detail below, the disclosed techniques generally involve determining a unique identifier (e.g., a Transaction ID) from the communications of the client, modifying a header of the communications to include this identifier, and then effectively routing the modified communications to the same service provider based on this identifier. As such, present embodiments block or prevent deadlock that can result from different service providers (e.g., in different clusers) attempting to fulfill multiple requests of a single client transaction.

Figure 1:
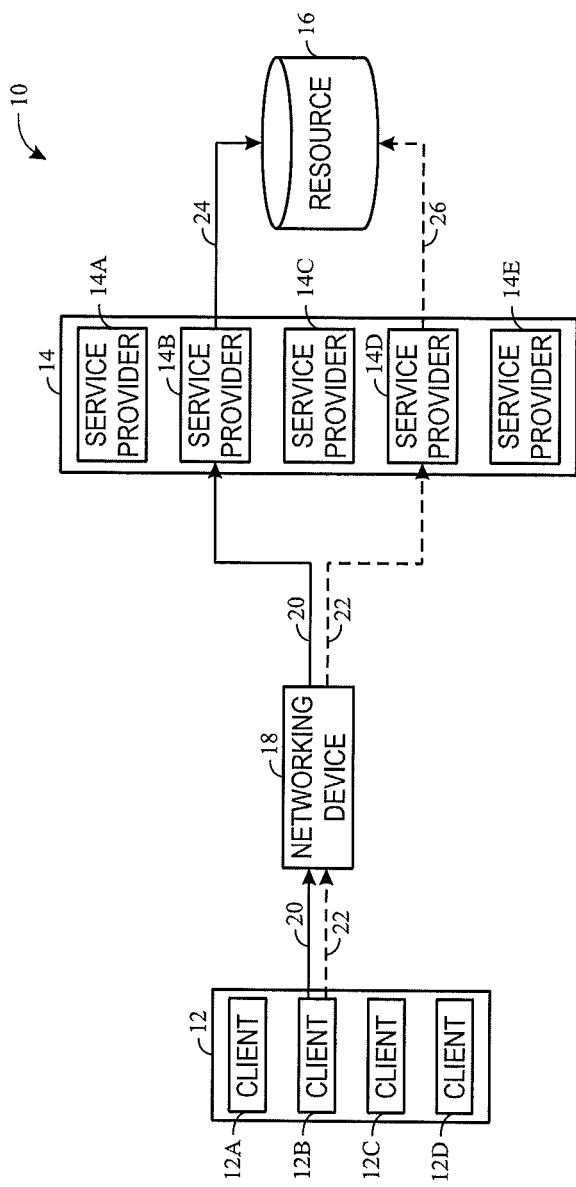
FIG. 1 is a schematic representation of an example of deadlock in a web service atomic transaction (WS-AT) system.

FIG. 1 illustrates an example of deadlock in a traditional WS-AT system 10, which is presently recognized as an issues with traditional systems. The illustrated WS-AT system 10 includes a number of clients 12 (e.g., 12A-D) that provide requests to a number of service providers 14 to use (e.g., access, read, lock, modify) a particular resource 16, such as a database. The clients 12 send requests to the service providers 14 by sending messages (e.g., Simple Object Access Protocol (SOAP) requests) via a networking device 18. For example, the networking device 18 may be a router that is programmed to provide load balancing. That is, the networking device 18 may route messages received from the clients 12 to the first available service provider 14 (e.g., 14A-E). It may be appreciated that the load balancing provided by the networking device 18 improves the efficiency of the system 10 by ensuring that the requests of the clients 12 are handled quickly and that the load is evenly spread across the service providers 14.

However, as illustrated in FIG. 1, this load balancing can result in deadlock in the WS-AT system 10. With reference to the example illustrated in FIG. 1, client 12B is attempting to perform a client transaction that results in the generation of two separate messages 20 and 22. By specific example, client 12B may be attempting to increase the balance of a banking account stored in the database 16, and in doing so, two messages are generated: message 20 to request the current account balance, and message 22 to request the addition of the appropriate amount to the current account balance. Since the networking device 18 generally routes client messages to a service provider based on information in the Hypertext Transfer Protocol (HTTP) header, and since there is no information in the HTTP header of messages 20 and 22 to indicate that they are part of the same client transaction, the network device 18 is unaware that both of these messages 20 and 22 are part of the same client transaction.

Accordingly, since the WS-AT system 10 illustrated in FIG. 1 lacks affinity routing, the networking device 18 receives the messages 20 and 22 and provides these messages to service providers 14 according to a load-balancing strategy, for example, in a round-robin fashion. As such, the message 20 is received by service provider 14B, while the message 22 is received by service provider 14D. The service provider 14B accesses the database 16 first (as indicated by the arrow 24) locking one or more records associated with the account. Accordingly, as presently recognized, when service provider 14D attempts to update the records associated with the same account to update the account balance (as indicated by the arrow 26) the service provider 14D is unable to lock the records associated with the account, resulting in deadlock as the client transaction remains uncompleted. If the deadlock continues for a sufficient amount of time, the request 26 made by service provider 14B will time-out, likely resulting in the client 12B and/or the service provider 14B repeating the request, increasing overhead and reducing efficiency of the system 10.

Figure 2:
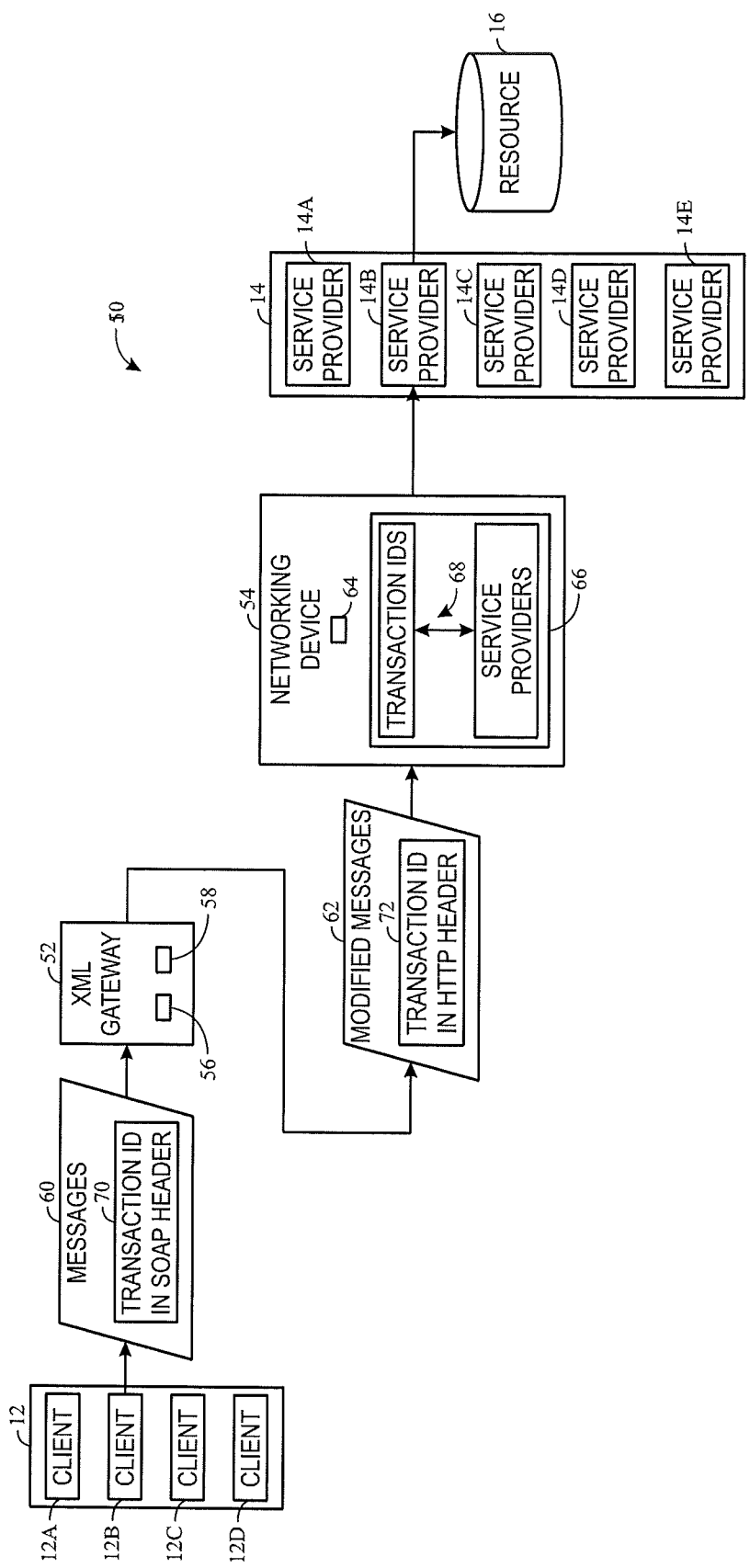
FIG. 2 is a schematic representation of a WS-AT system that avoids deadlock via affinity routing, in accordance with embodiments of the present technique.

With the foregoing in mind, FIG. 2 illustrates an embodiment of WS-AT system 50, in accordance with embodiments of the present approach, which utilizes routing affinity at the transaction level to avoid the deadlock situation discussed above. Like the WS-AT system 10 illustrated in FIG. 1, the WS-AT system 50 of FIG. 2 includes a number of clients 12 that interact with a number of service providers 14 to use (e.g., access, read, lock, modify) a particular resource 16, such as a database. For the embodiment illustrated in FIG. 2, the clients 12 send requests to the service providers 14 by sending messages (e.g., SOAP requests) via an extensible markup language (XML) gateway 52 and a networking device 54 of the system 50.

The XML gateway 52 is generally a computing device that includes a memory 56 and a processor 58 programmed to receive and process messages 60 from the clients 12 into modified messages 62, as discussed below. The networking device 54 is also generally a computing device (e.g., a router) that includes a memory 66 and a processor 64 programmed receive the modified messages 62 from the XML server 52 and appropriately route these modified messages 62 to one of the service providers 14. As discussed below, the networking device 54 is capable of enabling affinity routing (e.g., for existing and continuing client transactions), while also providing load balancing for new client transactions. Further, as discussed in greater detail below, the illustrated networking device 54 includes a routing table 68 stored in the memory 66 that associates the transaction identifiers (Transaction IDs) of particular client transactions with particular service providers 14.

The WS-AT framework defines a transaction identifier (Transaction ID) that is included in a particular portion of all messages 60 provided by the clients 12. In certain embodiments, for example, the Transaction ID included in each message 60 may be a string of characters that uniquely identifies to which clients transaction a particular message 60 belongs, and is used within the WS-AT framework to provide transactional functionality. As illustrated in FIG. 2, for example, when the messages 60 are simple object access protocol (SOAP) requests, each of the messages 60 generally include a Transaction ID in the SOAP header 70.

Figure 3:
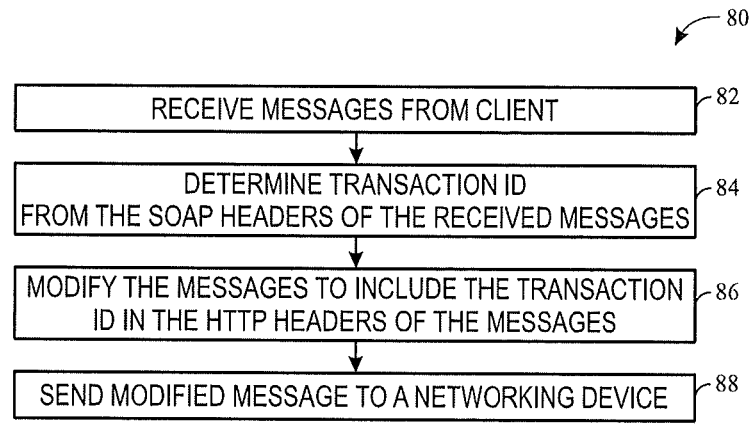
FIG. 3 is a flow diagram illustrating an example of a process whereby the processor of an XML gateway can function within the WS-AT system of FIG. 2 to enable affinity routing, in accordance with embodiments of the present technique.

FIG. 3 illustrates an example embodiment of a process 80 whereby the XML gateway 52 operates to enable routing affinity within the system 50 illustrated in FIG. 2. The process 80 illustrated in FIG. 3 begins with the processor 58 of the XML gateway 52 receiving (block 82) messages 60 from a client 12B. The process 80 continues with the processor 58 of the XML gateway 52 determining (block 84) the Transaction ID associated with each of the messages 60 from the SOAP headers 70 of the messages 60. The processor 58 of the XML gateway 52 then modifies (block 86) the received messages 60 to generate modified messages 62 that (e.g., additionally or alternatively) include the Transaction ID in the HTTP header 72. Finally, the processor 58 of the XML gateway 52 sends (block 88) the modified messages 62 to the networking device 54.

Figure 4:
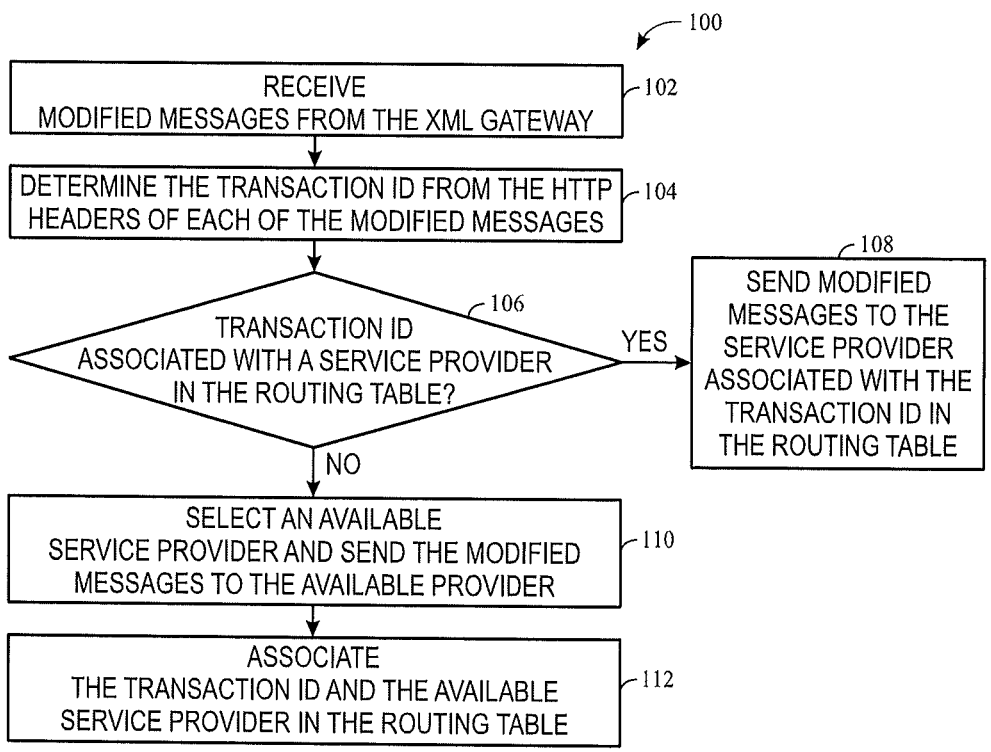
FIG. 4 is a flow diagram illustrating an example of a process whereby the processor of a networking device can function within the WS-AT system of FIG. 2 to enable affinity routing, in accordance with embodiments of the present technique.

FIG. 4 illustrates an example embodiment of a process 100 whereby the network device 54 operates to enable affinity routing within the system 50 illustrated in FIG. 2. The process 100 illustrated in FIG. 4 begins with the processor 64 of the networking device 54 receiving (block 102) the modified messages 62 from the XML gateway 52. The processor 64 of the networking device 54 may then determine (block 104) the Transaction ID of each of the messages 62 from the HTTP header of the modified message 62. It may be appreciated that, in general, the networking device 54 is adept at efficiently reading and analyzing information in the HTTP header 72, which speeds this step of the process 100.

Continuing through the process 100 illustrated in FIG. 4, next, the processor 64 may search the routing table 68 stored in the memory 66 of the networking device 54 to determine (block 106) whether the Transaction ID determined from the modified messages 62 is presently associated with a particular service provider 14. If the processor 64 determines that the Transaction ID is associated with a particular service provider in the routing table 68, then the processor 64 sends (block 108) the modified message to the associated service provider (e.g., service provider 14B, as illustrated in FIG. 2).

If, however, the processor 64 determines that the Transaction ID in the modified message 62 is not presently associated with one of the service providers 14 in the routing table 68, then the modified message 62 received in block 102 may be the first message of a series of messages of client transaction. As such, the processor 64 may use a load-balancing algorithm (e.g., a round-robin algorithm) to select a service provider (e.g., service provider 14B, as illustrated in FIG. 2), and then send (block 110) the modified message 62 to the available service provider to address the request of the client transaction. Finally, the illustrated process 100 concludes with the processor 64 of the networking device 54 adding the Transaction ID to the routing table 68, and associating the Transaction ID with the service provider to which the modified message was sent, which establishes a temporary affinity between Transaction ID and the particular service provider 14B.

Additionally, the routing table 68 may also be modified over time by the processor 64 of the networking device 54 to control the duration of affinity between the Transaction IDs and the service providers 14. For example, as mentioned above, in certain embodiments, each association that is added to the routing table 68 may only persist for a predefined time period (e.g., an affinity duration greater than or equal to 10 seconds, less than or equal to 30 seconds, less than or equal to 100 seconds, or between 10 second and 100 second) before the association is removed (e.g., deleted, erased, overwritten). As discussed below, in certain embodiments, the predefined time period may begin with the receipt of an initial message, or with the receipt or delivery of a most recent message, of a client transaction.

In certain embodiments, as illustrated by the example process 120 of FIG. 5, the predefined time period may begin from the receipt of the first message 62 of a client transaction (e.g., by the XML gateway, networking device, or service provider). As illustrated, in certain embodiments, when an association between a Transaction ID and a service provider 14 is added to the routing table 68 by the processor 64 of the networking device 56, a time stamp may be created or defined (block 122) for this association (e.g., the record of the routing table 68 storing the association may include a time stamp field that is suitably populated with the current time upon creation/instantiation), and this time stamp may define the beginning of the predefined time window. As such, the processor 64 of the networking device may subsequently determine (block 124) whether the predefined time period has passed relative to the time stamp, and if it has not, check again later, as indicated by arrow 125. When the processor 64 determines that the predefined period of time has passed relative to the time stamp, the processor 64 removes (block 126) the association between the Transaction ID and the service provider 14 in the routing table. This approach is beneficial in that the load can remain better balanced between the service providers 14. However, because of variations in the length of different transactions, this approach can result in the predefined time period ending before all of the messages related to certain client transactions can be received by the service provider 14.

With this in mind, in certain embodiments, the predefined time period may begin from the receipt of the last (e.g., most recent) message 62 of a client transaction (e.g., by the XML, gateway, networking device, or service provider), as illustrated by the process 130 of FIG. 6. As illustrated in FIG. 6, in certain embodiments, an entry in the routing table 68 that stores an association between a Transaction ID and a service provider 14 includes a time stamp that is updated (block 132) to reflect a time at which the most recent message 62 was received by the networking device 54 (or the time at which the most recent message 62 was sent to the service provider 14 by the networking device 54), and this time stamp may define the beginning of the predetermined time window. As such, the processor 64 of the networking device may subsequently determine (block 134) whether the predefined time period has passed relative to the time stamp, and if it has not, the processor 64 may await additional messages from the client during the predefined time period, as indicated by arrow 125. If additional messages are received during the predefined time period, the time stamp is updated, and the predefined time period is reset. When the processor 64 determines that the predefined period of time has passed relative to the most recent time stamp without the receipt of additional messages from the client, the processor 64 removes (block 126) the association between the Transaction ID and the service provider 14 in the routing table. It may be appreciated that this approach is beneficial in that, with a properly selected predefined time window, the affinity between the Transaction ID and the service provider will be guaranteed for the duration of the transaction. However, since service providers 14 staying in service longer will shoulder more of the load over time, this approach can hamper load balancing.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A web service atomic transaction (WS-AT) system, comprising:
   a networking device comprising a first memory and a first processor, wherein the first memory stores a routing table that enables affinity routing, and wherein the first processor is configured to:
      receive a modified message from a gateway, wherein the modified message comprises a Transaction Identifier (ID) within a hypertext transfer protocol (HTTP) header of the modified message, and wherein the modified message is indicative of an access request from a client;
      analyze the HTTP header of the modified message to determine whether the Transaction ID is present within the routing table;
      in response to determining that the Transaction ID is present within the routing table, send the modified message to an associated service provider of a plurality of service providers; and
      in response to determining that the Transaction ID is not present within the routing table, send the modified message to an available service provider of the plurality of service providers and associate the Transaction ID with the available service provider in the routing table.

2. The system of claim 1, wherein the routing table stores a plurality of associations between a plurality of Transaction IDs and the plurality of service providers.

3. The system of claim 2, wherein the routing table comprises a time stamp that indicates a beginning of a predefined time window for which each respective association of the plurality of associations persists.

4. The system of claim 3, wherein the first processor of the networking device is configured to generate the time stamp upon associating the Transaction ID with the available service provider to transform the available service provider into the associated service provider, and wherein the first processor is configured to remove the association between the Transaction ID and the associated service provider from the routing table at an end of the predefined time window.

5. The system of claim 3, wherein the first processor of the networking device is configured to generate the time stamp upon sending the modified message to the associated service provider, and wherein the first processor is configured to remove the association between the Transaction ID and the associated service provider from the routing table at an end of the predefined time window.

6. The system of claim 1, comprising the gateway communicatively coupled to the networking device, wherein the gateway comprises a second memory and a second processor configured to generate the modified message by:
   receiving a message indicative of the access request from the client;
   determining the Transaction ID of the message;
   modifying the message to include the Transaction ID in the Hypertext Transfer Protocol (HTTP) header of the message; and
   sending the modified message to the networking device communicatively coupled to the gateway.

7. The system of claim 6, wherein the second processor of the gateway is configured to determine the Transaction ID of the message from a Simple Object Access Protocol (SOAP) header of the message, and wherein the first processor of the networking device is designed to process HTTP headers.

8. The system of claim 1, wherein the access request indicated by the modified message comprises a database access request of a client transaction, and wherein the client transaction comprises at least one additional database access request.

9. A web service atomic transaction (WS-AT) system, comprising:
   a networking device comprising a first memory and a first processor, wherein the first memory comprises a routing table that stores temporary associations between a plurality of Transaction Identifiers (IDs) and a plurality of service providers to facilitate WS-AT affinity routing, and wherein the first processor of the networking device is configured to:
      receive a modified message from a gateway communicatively coupled to the networking device, wherein the modified message was previously modified to add a Transaction ID associated with a client access request from a first header to a second header of the modified message;
      determine that the Transaction ID is not present within the routing table, and in response, send the modified message to an available service provider of the plurality of service providers and associate the Transaction ID with the available service provider in the routing table;
      subsequently receive a second modified message from the gateway, wherein the second modified message was previously modified to add the Transaction ID from a third header to a fourth header of the second modified message; and
      determine that the routing table includes the Transaction ID and the associated service provider, and in response, send the second modified message to the associated service provider.

10. The system of claim 9, comprising the gateway, wherein the gateway comprises a second memory and a second processor configured to:
- receive a message indicative of the client access request;
- determine the Transaction Identifier (ID) of the message from the first header of the message;
- modify the message to include the Transaction ID in the second header of the message; and
- send the modified message to the networking device.

11. The system of claim 10, wherein the gateway comprises an extensible markup language (XML) gateway, wherein the first header of the message comprises a Simple Object Access Protocol (SOAP) header, and wherein the second header of the message comprises a Hypertext Transfer Protocol (HTTP) header.

12. The system of claim 9, comprising the plurality of service providers, wherein the plurality of service providers is communicatively coupled to the networking device and at least one common resource.

13. The system of claim 12, wherein the client access request comprises a request to retrieve or update data within the at least one common resource, and wherein the at least one common resource comprises a database.

14. The system of claim 9, wherein, upon associating the Transaction ID with the available service provider to transform the available service provider into the associated service provider, the first processor of the networking device is configured to remove the association between the Transaction ID and the associated service provider from the routing table after a predefined period of time.

15. The system of claim 9, wherein, upon sending the second modified message to the associated service provider, the first processor of the networking device is configured to remove the association between the Transaction ID and the associated service provider from the routing table after a predefined period of time.

16. The system of claim 9, wherein the first processor of the networking device is configured to implement a load balancing algorithm to select the available service provider from the plurality of service providers.

17. A method of operating a web service atomic transaction (WS-AT) system, the method comprising:
- receiving, at a first processor of a networking device, a first modified message from a gateway, wherein the first modified message was previously modified to include a Transaction Identifier (ID) within a first hypertext transfer protocol (HTTP) header of the first modified message, and wherein the first modified message is indicative of a database access request from a client;
- determining, via the first processor, that the Transaction ID is not yet linked with an associated service provider of a plurality of service providers in a routing table stored in a memory of the networking device, wherein the routing table stores temporary associations between a plurality of Transaction Identifiers (IDs) and the plurality of service providers; and
- in response to determining that the Transaction ID is not yet linked, sending, via the first processor, the first modified message to a particular service provider of the plurality of service providers and associating the Transaction ID with the particular service provider in the routing table.

18. The method of claim 17, comprising:
- subsequently receiving, at the first processor of the networking device, a second modified message from the gateway, wherein the second modified message was previously modified to include the Transaction ID within a second HTTP header of the second modified message; and
- determining, via the first processor, that the Transaction ID is already associated with the particular service provider in the routing table, and in response, sending the second modified message to the particular service provider.

19. The method of claim 18, comprising:
- determining, via the first processor of the networking device, that either:
  - a predetermined amount of time has passed since sending the second modified message to the particular service provider, or
  - the predetermined amount of time has passed since associating the Transaction ID with the particular service provider in the routing table; and
- in response, removing the association between the Transaction ID and the particular service provider in the routing table.

20. The method of claim 17, comprising generating the modified message by:
- receiving, at a second processor of the gateway, a first message indicative of the database access request, wherein the first message includes a Simple Object Access Protocol (SOAP) header having the Transaction ID;
- inserting, via the second processor, the Transaction ID from the SOAP header into the first HTTP header of the first message to generate the first modified message; and
- sending, via the second processor, the first modified message to the networking device communicatively coupled to the gateway.

* * * * *